Aug. 5, 1969 R. C. POWELL 3,459,262

THERMOSTAT DIAL CLICKING MECHANISM

Filed July 31, 1967

INVENTOR.
RONALD C. POWELL
By Lauren Hemminger
ATTORNEY.

United States Patent Office 3,459,262
Patented Aug. 5, 1969

3,459,262
THERMOSTAT DIAL CLICKING MECHANISM
Ronald C. Powell, Los Angeles, Calif., assignor to International Telephone and Telegraph Corporation, New York, N.Y., a corporation of Maryland
Filed July 31, 1967, Ser. No. 657,325
Int. Cl. G09f 9/00; G01d 21/00
U.S. Cl. 116—133　　　　　　　　　　　7 Claims

ABSTRACT OF THE DISCLOSURE

Toothlike serrations are resiliently mounted on the back side of a dial affixed to a control device shaft. A calibrated set of serrations provided on the control device housing mesh with the serrations of the dial such that rotative adjustment of the dial produces a clicking that is both audible and tactile as the teeth move into and out of mesh. The number of clicks is functionally related to the amount of adjustment imparted to the control device. A further aspect is that the serrations are produced by one-piece molding as part of the dial and housing respectively.

---

The present invention relates broadly to a control shaft adjustment indicator, and, more particularly, to a device for providing a calibrated tactile and auditory indication of the adjustment or change in position of a manually operated control shaft.

Background of the invention

Manually operated control devices are available in a great variety of sizes and shapes for providing selective adjustment or modification of some given control parameter. To name but a few, such devices are used to adjust slidewire resistance potentiometers, variable capacitors, variable indicators and to provide direct valve control of a gas burner, for example.

In the use of these control devices, recognition or determination of the control setting usually depends entirely upon the operator's visual sense, that is, sighting of indication markings on a dial or reading some sort of meter presentation. Specifically, in the case of domestic heating control, room thermostat settings are made by rotative adjustment of a dial with the setting indication being visually obtained from numerical inscriptions on the dial itself or on adjacent parts of the thermostat housing.

Description of the prior art

It has been found desirable and advantageous, particularly from the user psychology standpoint, to provide additional means other than visual for apprising the user that an adjustment is, in fact, being made. One way of accomplishing this has been the addition of "clicker" devices to otherwise silent controls, which devices make a series of audible clicks during shaft rotation. These clicks, however, have in the past merely indicated that adjustment of some sort was being effected, and did not give a quantitative indication of the degree of adjustment made.

A usual prior art clicker for use with manually operated controls has included a cam on the control shaft having a plurality of flat surfaces that successively snap against a flat spring during shaft rotation. These extra clicker elements are, of course, a factor of cost, and in the case of large volume use such as controls for cooking ranges, washers, television sets, and the like, this additional cost factor can be important.

It is, therefore, a principal object of this invention to provide a control shaft adjustment indicator that gives calibrated audible indications of shaft adjustment.

Another object of the invention is the provision of such a shaft adjustment indicator for use with a dial-and-shaft control device where the indicator parts are unitary with the dial and housing.

A further object is the provision of a shaft adjustment indicator as in the above objects in which parts of the indicator are unitary with a manually operated dial mounted to the shaft, such that the audible indications can be tactilely sensed.

Summary of the invention

The above and other objects of the invention are accomplished by incorporating on the surface of a control dial that faces the control housing at least one resiliently mounted serration. A set of sawtooth serrations are formed in the housing surface facing the dial for continuous engagement with the serration of the dial. The mutual spacing of the serrations on the housing are calibrated such that on rotation of the dial audible and tactile indications having a quantitative functional relationship to the parameter being controlled are received by the user.

Other objects and advantages may become apparent from a consideration of a preferred embodiment of the invention. For this purpose there is depicted one such embodiment in a drawing accompanying and forming a part of the present specification. Also, this embodiment will be described in detail herein.

Description of the preferred embodiment

Figure 1:
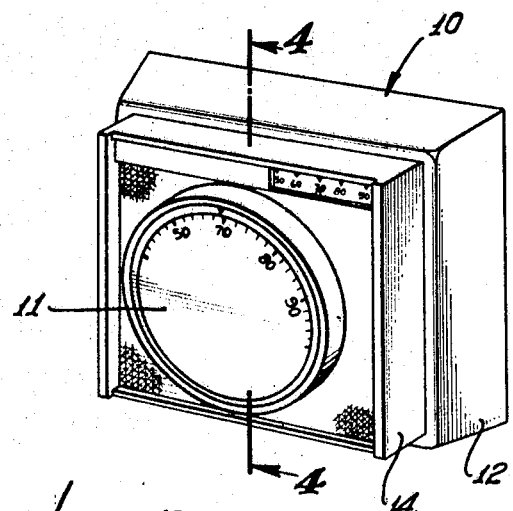
FIGURE 1 is a perspective view of a typical manually-operated control device viewed generally into the dial end.

With reference now especially to FIGURE 1, there is depicted a typical control device 10, such as a thermostat, for example, having a dial 11 and a substantially rectangular housing 12 containing the main control device elements. Rotative manipulation of the dial effects adjustment of the control device, and, in that way, modifies and controls operation of collateral associated equipment. Moreover, by the special means of the invention that will be described in detail below, rotation of the dial is accompanied by a series of clicks that can be both heard and felt, with the number of such clicks sensed having a predetermined functional relationship to the adjustment of the controlled parameter.

Figure 2:
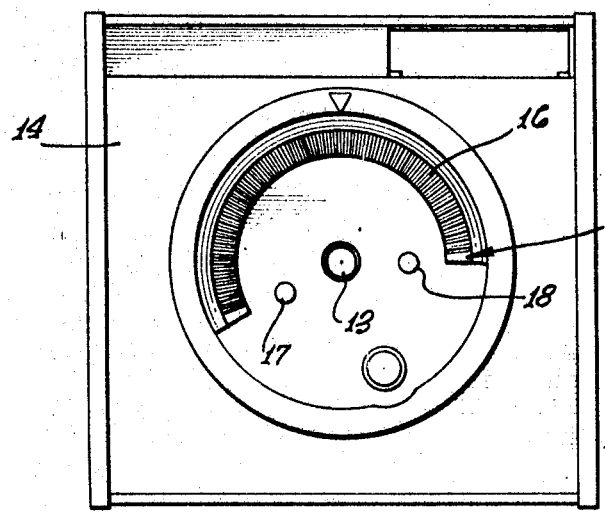
FIGURE 2 is a perspective enlarged view of the front control housing of the device of FIGURE 1 with the dial removed illustrating certain parts of the invention.

FIGURE 2 shows the device 10 with the dial removed and viewing generally into the opening 13 which receives the dial shaft. The front housing surface can be either integral with the housing side and top walls, or, as here depicted, formed into a separate plate 14. Although a number of materials may be found acceptable from which to construct the plate 14 (or the entire housing, as the case may be), best results to date have been obtained by molding the plate in a single piece from a thermosetting plastic such as so-called high impact polystyrene. The latter material has exceptionally good resistance to frictional wear, which is an important characteristic for long lived operation of the invention as will be apparent from the description given herein.

A raised bandlike portion 15 is formed on the outer surface of the plate 14 extending in a path along the arc of a circle circumscribed about the dial shaft opening 13 as a center plurality of sawtooth serrations 16 are provided in the outer surface of the band portion 15, the long dimensions of which serrations lie along radii through the shaft center. A pair of stops 17 and 18 rise from the plate surface, one at each side of the opening 13, for cooperating with a member carried by the dial, in a way that will be shown later, to limit rotation of the dial in both the clockwise and counterclockwise directions.

The spacing of the serrations 16 is uniform, and preselected to correspond to some fixed amount of adjustment of the control device 10. That is, the spacing of adjacent serrations or teeth is affirmatively made to correspond to a unit, or some desired multiple of units of the parameter being controlled or, alternatively, of a condition being modified by collateral equipment. Exemplary of this important feature in one application of the invention to a domestic heating control thermostat, the spacing of adjacent serrations was made to correspond to an angular rotation of the control shaft equivalent to approximately 2 degrees F. of heating change.

Figure 3:
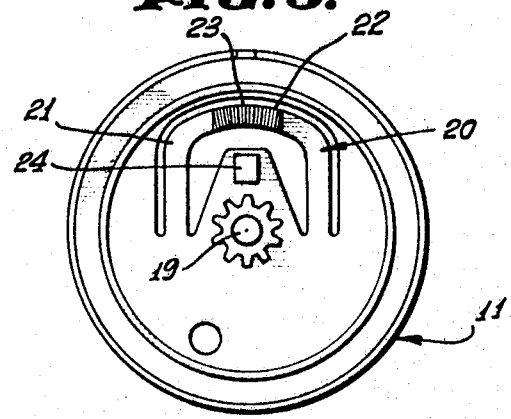
FIGURE 3 is a depiction of the dial of the control device of FIGURE 1 showing other parts of the invention incorporated therewith.
Figure 4:
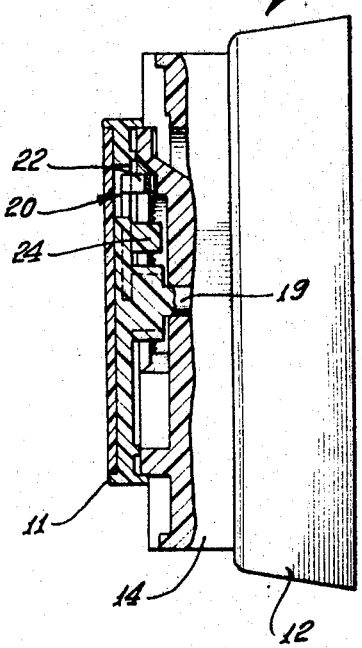
FIGURE 4 is an enlarged sectional view taken along the line 4—4 of FIGURE 1 showing the invention assembled.
Figure 5:
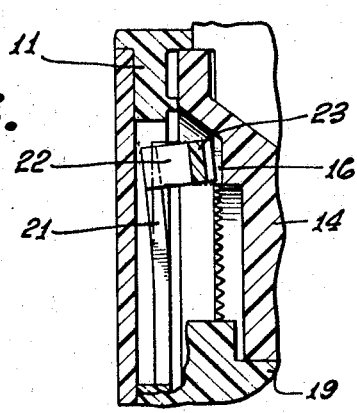
FIGURE 5 is an enlarged sectional view of a portion of the control device.

Simultaneously referring to both FIGURES 3 and 4, the back side of the dial 11 is seen to include a shaft 19 for reception within the opening 13, and an actuator 20 that cooperates with the serrations 16 on the plate 14 to produce the desired audible and tactile adjustment indication. The actuator consists of a resilient generally U-shaped member 21 that is integrally formed with the main dial body and connected therewith solely at the extremities of its two legs. The actuator lies substantially in the same plane as the major back surface of the dial, except for a portion 22 centrally located on the crossbar which extends from the dial a slight amount. The outwardly directed surface of the portion 22 is formed into at least one and preferably a plurality of serrations 23 of dimensions (and mutual spacing) the same as those of the sawtooth serrations 16 on the plate 14. Also, these serrations are laid out along a circular path and at a distance from the shaft 19 equal to the distance of serrations 16 from shaft opening 13.

A generally rectangular stop and positioning member 24 rises from the back surface of the dial at a point lying on a radial line through the shaft and midpoint of the serrations 23. The spacing of the member 24 from the shaft is the same as the spacing of the stops 17 and 18 from the opening 13 in the plate 14 for a purpose that will be made clear later.

A number of different plastic materials are commercially available having the necessary strength and abrasion resistance properties making them ideal for constructing the U-shaped member 21 and dial 11. The butyrates have shown themselves to be exceptional for this purpose.

When assembled as shown in FIGURE 4, the dial shaft is received within the opening 13 sufficiently so the terminus of the member 24 contacts the outer surface of the plate 14 in the region between the stops 17 and 18, the extremity of the shaft being connected to the control apparatus in any suitable manner (not shown). At this time, due to the relative dimensions of the positioning member 24 and the portion 22, the serrations 22 are fully seated within the accommodating serrations 16, and the legs of the member 21 are resiliently deflected into tension causing them to exert a continuous restoring force on the member 21 in a direction toward the housing. Rotation of the dial produces a camming of the two sets of serrations on one another, which is accompanied by a series of clicks that can be both heard and felt as the tips of one set of serrations are snapped into the "valleys" of the other set of serrations. Each such click informs the one adjusting the control that a precise amount of adjustment has been effected as a result of the serration spacing being calibrated to the controlled parameter (e.g. 2 degrees F. per click in the thermostat application, supra).

There is provided in accordance with the practice of the present invention, a device for incorporation into a dial-and-shaft control to provide a calibrated number of audible indications that are representative of the degree of rotation being immediately imparted to the shaft. Also, since certain operative parts of the invention are unitary with the dial assembly, the audible indications can be tactilely sensed by the one setting the control. Of special importance is the fact that all of the elements of the invention can be molded unitarily with the dial and housing, respectively, and in that way eliminate the need for special assembly steps in manufacturing as well as reducing unit cost by not requiring extra springs and cams as in certain prior art devices.

While the invention has been described in connection with a specific form, it is to be understood that numerous variations and embodiments thereof can be accomplished without departing from the general spirit of the invention.

What is claimed is:

1. Apparatus for providing calibrated non-visual indications of the rotative adjustment of a manually operated control device having a control housing, a shaft extending from the housing and dial means secured to shaft, comprising: a plurality of serrations located on a surface of the housing adjacent the shaft, the mutual spacing of the serrations having a predetermined functional relationship to the parameter being controlled by the device; a resilient U-shaped actuator having its two leg portions secured to said dial means and at least one serration located on a portion of said actuator and resiliently bearing against the set of serrations on the housing whereby rotative adjustment of the dial causes the serrations on the dial to interact with the serrations on the housing producing calibrated indications that are both audible and tactile.

2. Apparatus as in claim 1, in which the serration on the dial means is located on the cross-bar of the resilient U-shaped member, said member being secured to the dial means solely at the two ends of its leg portions.

3. Apparatus as in claim 2, in which the U-shaped member lies substantially in a single plane transverse to the shaft, except for a portion of the cross-bar including the serration, which is spaced from the plane in a direction toward the housing.

4. Apparatus as in claim 3, in which positioning means are provided on the dial means for contacting the housing to hold the U-shaped member at such a spacing relative to the housing that when the serration on the dial means is meshed with the serrations on the housing, the U-shaped member is deflected into tension exerting a potential restoring force on the U-shaped member in a direction toward the housing.

5. Apparatus as in claim 4, in which a pair of stop members are provided on the housing for cooperation with the positioning means to provide clockwise and counterclockwise limits to rotative adjustment of the control device.

6. Apparatus as in claim 4, in which the U-shaped member, serration and positioning are of one-piece plastic molding construction unitary with the dial means.

7. Apparatus as in claim 5, in which the stop members, plurality of serrations and housing surface adjacent the shaft are a one-piece molding of high-impact polystyrene.

References Cited

UNITED STATES PATENTS

| 2,470,582 | 5/1949 | Seasongood | 116—124 |
| 2,629,951 | 3/1953 | Kittridge. | |
| 2,834,316 | 5/1958 | Perez et al. | 116—133 |
| 2,901,998 | 9/1959 | Keith | 116—115 |
| 3,151,598 | 10/1964 | Bourns et al. | 116—133 X |
| 3,176,541 | 4/1965 | Keeling et al. | 116—133 X |
| 3,300,594 | 1/1967 | Paine et al. | 200—166 X |

LOUIS R. PRINCE, Primary Examiner

D. M. YASICH, Assistant Examiner

U.S. Cl. X.R.

74—566; 116—114